United States Patent
Eshet

(10) Patent No.: US 10,043,279 B1
(45) Date of Patent: Aug. 7, 2018

(54) ROBUST DETECTION AND CLASSIFICATION OF BODY PARTS IN A DEPTH MAP

(71) Applicant: APPLE INC., Cupertino, CA (US)

(72) Inventor: Yaron Eshet, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 35 days.

(21) Appl. No.: 15/272,455

(22) Filed: Sep. 22, 2016

Related U.S. Application Data

(63) Continuation of application No. 14/960,465, filed on Dec. 7, 2015, now abandoned.

(51) Int. Cl.
G06K 9/34 (2006.01)
G06T 7/00 (2017.01)
G06T 7/60 (2017.01)

(52) U.S. Cl.
CPC .......... *G06T 7/0075* (2013.01); *G06T 7/0044* (2013.01); *G06T 7/0057* (2013.01); *G06T 7/0067* (2013.01); *G06T 7/0085* (2013.01); *G06T 7/606* (2013.01); *G06T 2207/10021* (2013.01); *G06T 2207/10028* (2013.01); *G06T 2207/10048* (2013.01); *G06T 2207/30196* (2013.01)

(58) Field of Classification Search
USPC ..... 345/158, 419, 423; 348/208.14, 46, 169; 382/115, 128, 173, 199
See application file for complete search history.

(56) References Cited

U.S. PATENT DOCUMENTS

| | | | |
|---|---|---|---|
| 5,081,689 A | * | 1/1992 | Meyer .................. G06T 7/12 382/199 |
| 5,684,887 A | | 11/1997 | Lee et al. |
| 5,846,134 A | | 12/1998 | Latypov |
| 5,852,672 A | | 12/1998 | Lu |
| 5,862,256 A | | 1/1999 | Zetts et al. |

(Continued)

FOREIGN PATENT DOCUMENTS

| | | |
|---|---|---|
| JP | H03-029806 A | 2/1991 |
| JP | H10-235584 A | 9/1998 |

(Continued)

OTHER PUBLICATIONS

Ding Y., et al., "Range image segmentation using principal curvatures and principal directions," 5th International Conference on Information, Communications and Signal Processing, Dec. 2005.*

(Continued)

*Primary Examiner* — Xuemei Chen
(74) *Attorney, Agent, or Firm* — D. Kligler IP Services Ltd.

(57) ABSTRACT

A method for processing data includes receiving a depth map of a scene containing at least a part of a body of a humanoid form. The depth map includes a matrix of pixels having respective pixel depth values. A digital processor extracts from the depth map a curvature map of the scene. The curvature map includes respective curvature values and curvature orientations of at least some of the pixels in the matrix. The depth map is segmented using the curvature values and curvature orientations in the curvature map so as to extract three-dimensional (3D) coordinates of one or more limbs of the humanoid form.

15 Claims, 4 Drawing Sheets

(56) References Cited

U.S. PATENT DOCUMENTS

| | | | |
|---|---|---|---|
| 5,864,635 A | 1/1999 | Zetts et al. | |
| 5,870,196 A | 2/1999 | Lulli et al. | |
| 6,002,808 A | 12/1999 | Freeman | |
| 6,176,782 B1 | 1/2001 | Lyons et al. | |
| 6,256,033 B1 | 7/2001 | Nguyen | |
| 6,518,966 B1 | 2/2003 | Nakagawa et al. | |
| 6,608,917 B1* | 8/2003 | Wei | G06T 7/74 382/132 |
| 6,658,136 B1 | 12/2003 | Brumitt | |
| 6,681,031 B2 | 1/2004 | Cohen et al. | |
| 6,771,818 B1 | 8/2004 | Krumm et al. | |
| 6,856,314 B2 | 2/2005 | Ng | |
| 6,857,746 B2 | 2/2005 | Dyner | |
| 6,993,157 B1* | 1/2006 | Oue | B60R 25/2045 348/169 |
| 7,003,134 B1 | 2/2006 | Covell et al. | |
| 7,003,136 B1 | 2/2006 | Harville | |
| 7,013,046 B2 | 3/2006 | Kawamura et al. | |
| 7,042,440 B2 | 5/2006 | Pryor et al. | |
| 7,170,492 B2 | 1/2007 | Bell | |
| 7,215,815 B2 | 5/2007 | Honda | |
| 7,259,747 B2 | 8/2007 | Bell | |
| 7,302,099 B2 | 11/2007 | Zhang et al. | |
| 7,317,830 B1 | 1/2008 | Gordon et al. | |
| 7,340,077 B2* | 3/2008 | Gokturk | G06F 3/017 348/208.14 |
| 7,348,963 B2 | 3/2008 | Bell | |
| 7,428,542 B1 | 9/2008 | Fink et al. | |
| 7,536,032 B2 | 5/2009 | Bell | |
| 7,555,158 B2 | 6/2009 | Park et al. | |
| 7,580,572 B2 | 8/2009 | Bang et al. | |
| 7,583,275 B2 | 9/2009 | Neumann et al. | |
| 7,602,965 B2* | 10/2009 | Hong | G06T 7/0012 382/128 |
| 7,634,133 B2* | 12/2009 | Jerebko | G06T 7/10 382/128 |
| 7,706,571 B2 | 4/2010 | Das et al. | |
| 7,925,077 B2 | 4/2011 | Woodfill et al. | |
| 7,974,443 B2 | 7/2011 | Kipman et al. | |
| 8,175,374 B2 | 8/2012 | Pinault et al. | |
| 8,249,334 B2* | 8/2012 | Berliner | G06K 9/00362 345/419 |
| 8,270,688 B2* | 9/2012 | Fan | G06T 7/0012 382/128 |
| 8,280,106 B2 | 10/2012 | Ma | |
| 8,280,165 B2 | 10/2012 | Meng et al. | |
| 8,320,621 B2 | 11/2012 | McEldowney | |
| 8,358,342 B2 | 1/2013 | Park | |
| 8,379,926 B2 | 2/2013 | Kanhere et al. | |
| 8,405,656 B2 | 3/2013 | El Dokor et al. | |
| 8,411,149 B2 | 4/2013 | Maison et al. | |
| 8,411,932 B2 | 4/2013 | Liu et al. | |
| 8,433,104 B2 | 4/2013 | Cheng | |
| 8,456,517 B2 | 6/2013 | Spektor et al. | |
| 8,503,720 B2 | 8/2013 | Shotton et al. | |
| 8,565,479 B2 | 10/2013 | Gurman et al. | |
| 8,660,318 B2* | 2/2014 | Komura | G06K 9/00006 382/115 |
| 8,660,362 B2* | 2/2014 | Katz | G06K 9/00201 382/199 |
| 8,675,933 B2* | 3/2014 | Wehnes | G06K 9/6267 382/128 |
| 9,002,099 B2 | 4/2015 | Litvak et al. | |
| 9,019,267 B2 | 4/2015 | Gurman | |
| 9,047,507 B2 | 6/2015 | Gurman et al. | |
| 9,159,140 B2* | 10/2015 | Hoof | G06T 7/2086 |
| 9,301,722 B1* | 4/2016 | Martinson | G06K 9/0057 |
| 9,311,560 B2* | 4/2016 | Hoof | G06K 9/4604 |
| 9,317,741 B2* | 4/2016 | Guigues | G06K 9/00342 |
| 9,390,500 B1* | 7/2016 | Chang | G06T 7/004 |
| 9,727,776 B2* | 8/2017 | Dedhia | G06K 9/00268 |
| 2002/0071607 A1 | 6/2002 | Kawamura et al. | |
| 2003/0095698 A1 | 5/2003 | Kawano | |
| 2003/0113018 A1 | 6/2003 | Nefian et al. | |
| 2003/0156756 A1 | 8/2003 | Gokturk et al. | |
| 2003/0235341 A1 | 12/2003 | Gokturk et al. | |
| 2004/0091153 A1 | 5/2004 | Nakano et al. | |
| 2004/0183775 A1 | 9/2004 | Bell | |
| 2004/0184640 A1 | 9/2004 | Bang et al. | |
| 2004/0184659 A1 | 9/2004 | Bang et al. | |
| 2004/0258306 A1 | 12/2004 | Hashimoto | |
| 2005/0031166 A1 | 2/2005 | Fujimura et al. | |
| 2005/0088407 A1 | 4/2005 | Bell et al. | |
| 2005/0089194 A1 | 4/2005 | Bell | |
| 2005/0265583 A1 | 12/2005 | Covell et al. | |
| 2005/0271279 A1 | 12/2005 | Fujimura et al. | |
| 2006/0092138 A1 | 5/2006 | Kim et al. | |
| 2006/0115155 A1 | 6/2006 | Lui et al. | |
| 2006/0159344 A1 | 7/2006 | Shao et al. | |
| 2006/0165282 A1* | 7/2006 | Berretty | G06T 7/11 382/173 |
| 2007/0003141 A1 | 1/2007 | Rittscher et al. | |
| 2007/0076016 A1 | 4/2007 | Agarwala et al. | |
| 2007/0154116 A1 | 7/2007 | Shieh | |
| 2007/0188490 A1* | 8/2007 | Kanai | G06T 17/10 345/423 |
| 2007/0230789 A1 | 10/2007 | Chang et al. | |
| 2008/0123940 A1 | 5/2008 | Kundu et al. | |
| 2008/0226172 A1 | 9/2008 | Connell | |
| 2008/0236902 A1 | 10/2008 | Imaizumi | |
| 2008/0252596 A1 | 10/2008 | Bell et al. | |
| 2008/0260250 A1 | 10/2008 | Vardi | |
| 2008/0267458 A1 | 10/2008 | Laganiere et al. | |
| 2008/0310706 A1 | 12/2008 | Asatani | |
| 2009/0009593 A1 | 1/2009 | Cameron et al. | |
| 2009/0027335 A1 | 1/2009 | Ye | |
| 2009/0035695 A1 | 2/2009 | Campestrini et al. | |
| 2009/0078473 A1 | 3/2009 | Overgard et al. | |
| 2009/0083622 A1 | 3/2009 | Chien et al. | |
| 2009/0096783 A1 | 4/2009 | Shpunt et al. | |
| 2009/0116728 A1 | 5/2009 | Agrawal et al. | |
| 2009/0183125 A1 | 7/2009 | Magal et al. | |
| 2009/0222388 A1 | 9/2009 | Hua et al. | |
| 2009/0297028 A1 | 12/2009 | De Haan | |
| 2010/0002936 A1 | 1/2010 | Khomo | |
| 2010/0007717 A1 | 1/2010 | Spektor et al. | |
| 2010/0034457 A1 | 2/2010 | Berliner et al. | |
| 2010/0111370 A1 | 5/2010 | Black et al. | |
| 2010/0235786 A1 | 9/2010 | Maizels et al. | |
| 2010/0302138 A1 | 12/2010 | Poot et al. | |
| 2010/0303289 A1 | 12/2010 | Polzin et al. | |
| 2010/0322516 A1 | 12/2010 | Xu et al. | |
| 2011/0025689 A1 | 2/2011 | Perez et al. | |
| 2011/0052006 A1 | 3/2011 | Gurman et al. | |
| 2011/0164032 A1 | 7/2011 | Shadmi et al. | |
| 2011/0175984 A1 | 7/2011 | Tolstaya et al. | |
| 2011/0182477 A1 | 7/2011 | Tamrakar et al. | |
| 2011/0211754 A1 | 9/2011 | Litvak et al. | |
| 2011/0237324 A1 | 9/2011 | Clavin et al. | |
| 2011/0291926 A1* | 12/2011 | Gokturk | G06F 3/017 345/158 |
| 2011/0292036 A1 | 12/2011 | Sali et al. | |
| 2011/0293137 A1 | 12/2011 | Gurman et al. | |
| 2012/0070070 A1 | 3/2012 | Litvak | |
| 2012/0087572 A1 | 4/2012 | Dedeoglu et al. | |
| 2012/0162065 A1 | 6/2012 | Tossell et al. | |
| 2015/0227783 A1* | 8/2015 | Gurman | G06K 9/00362 348/46 |

FOREIGN PATENT DOCUMENTS

| | | |
|---|---|---|
| WO | 199935633 A2 | 7/1999 |
| WO | 2003071410 A2 | 8/2003 |
| WO | 2004107272 A1 | 12/2004 |
| WO | 2005003948 A1 | 1/2005 |
| WO | 2005094958 A2 | 10/2005 |
| WO | 2007043036 A1 | 4/2007 |
| WO | 2007078639 A2 | 7/2007 |
| WO | 2007105205 A2 | 9/2007 |
| WO | 2007132451 A2 | 11/2007 |

(56) References Cited

FOREIGN PATENT DOCUMENTS

| WO | 2007135376 A2 | 11/2007 |
|---|---|---|
| WO | 2008120217 A2 | 10/2008 |
| WO | 2010004542 A1 | 1/2010 |

OTHER PUBLICATIONS

Deboeverie, F., "Curvature-based Human Body Parts Segmentation in Physiotherapy," In Proceedings of the 10th International Conference on Computer Vision Theory and Applications (VISAPP-2015), pp. 630-637, Mar. 2015.*

Hart, D., U.S. Appl. No. 09/616,606, filed Jul. 14, 2000.

Bleiweiss et al., "Fusing Time-of-Flight Depth and Color for Real-Time Segmentation and Tracking", Editors R. Koch and A. Kolb: Dyn3D 2009, LNCS 5742, pp. 58-69, Springer-Verlag Berlin Heidelberg 2009.

Gesturetek Inc., Consumer Electronics Solutions, "Gesture Control Solutions for Consumer Devices", www.gesturetek.com, Toronto, Ontario, 1 page, Canada, 2009.

Segen et al., "Human-computer interaction using gesture recognition and 3D hand tracking", ICIP 98, Proceedings of the IEEE International Conference on Image Processing, vol. 3, pp. 188-192, Chicago, USA, Oct. 4-7, 1998.

Avidan et al., "Trajectory triangulation: 3D reconstruction of moving points from amonocular image sequence", PAMI, vol. 22, No. 4, pp. 348-357, Apr. 2000.

Leclerc et al., "The direct computation of height from shading", IEEE Conference on Computer Vision and Pattern Recognition, pp. 552-558, Jun. 3-7, 1991.

Zhang et al., "Shape from intensity gradient", IEEE Transactions on Systems, Man, and Cybernetics—Part A: Systems and Humans, vol. 29, No. 3, pp. 318-325, May 1999.

Zhang et al., "Height recovery from intensity gradients", IEEE Conference on Computer Vision and Pattern Recognition, pp. 508-513, Jun. 20-24, 1994.

Horn, B., "Height and gradient from shading", International Journal of Computer Vision, vol. 5, No. 1, pp. 37-75, Aug. 1990.

Bruckstein, A., "On Shape from Shading", Computer Vision, Graphics, and Image Processing Journal, vol. 44, issue 2, pp. 139-154, Nov. 1988.

Zhang et al., "Rapid Shape Acquisition Using Color Structured Light and Multi-Pass Dynamic Programming", 1st International Symposium on 3D Data Processing Visualization and Transmission (3DPVT), Padova, Italy, 13 pages, Jun. 19-21, 2002.

Besl, P., "Active Optical Range Imaging Sensors", Journal Machine Vision and Applications, vol. 1, issue 2, pp. 127-152, Apr. 1988.

Horn et al., "Toward optimal structured light patterns", Proceedings of International Conference on Recent Advances in 3D Digital Imaging and Modeling, pp. 28-37, Ottawa, Canada, May 1997.

Goodman, J.W., "Statistical Properties of Laser Speckle Patterns", Laser Speckle and Related Phenomena, pp. 9-75, Springer-Verlag, Berlin Heidelberg, 1975.

Asada et al., "Determining Surface Orientation by Projecting a Stripe Pattern", IEEE Transactions on Pattern Analysis and Machine Intelligence, vol. 10, No. 5, pp. 749-754, Sep. 1988.

Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.

Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.

Kimmel et al., Analyzing and synthesizing images by evolving curves with the Osher-Sethian method, International Journal of Computer Vision, vol. 24, issue 1, pp. 37-55, Aug. 1997.

Zigelman et al., "Texture mapping using surface flattening via multi-dimensional scaling", IEEE Transactions on Visualization and Computer Graphics, vol. 8, issue 2, pp. 198-207, Apr.-Jun. 2002.

Dainty, J.C., "Introduction", Laser Speckle and Related Phenomena, pp. 1-7, Springer-Verlag, Berlin Heidelberg, 1975.

Mendlovic, et al., "Composite harmonic filters for scale, projection and shift invariant pattern recognition", Applied Optics Journal, vol. 34, No. 2, pp. 310-316, Jan. 10, 1995.

Fua et al., "Human Shape and Motion Recovery Using Animation Models", 19th Congress, International Society for Photogrammetry and Remote Sensing, Amsterdam, The Netherlands, 16 pages, Jul. 2000.

Allard et al., "Marker-less Real Time 3D modeling for Virtual Reality", Immersive Projection Technology, Iowa State University, 8 pages, 2004.

Howe et al., "Bayesian Reconstruction of 3D Human Motion from Single-Camera Video", Advances in Neural Information Processing Systems 12, Denver, USA, 7 pages, 1999.

Ascension Technology Corporation, "Flock of Birds: Real-Time Motion Tracking", 2 pages, 2008.

Grammalidis et al., "3-D Human Body Tracking from Depth Images Using Analysis by Synthesis", Proceedings of the IEEE International Conference on Image Processing (ICIP2001), pp. 185-188, Thessaloniki, Greece, Oct. 7-10, 2001.

Nesbat, S., "A System for Fast, Full-Text Entry for Small Electronic Devices", Proceedings of the 5th International Conference on Multimodal Interfaces, ICMI 2003, Vancouver, Canada, 8 pages, Nov. 5-7, 2003.

Softkinetic S.A., "3D Gesture Recognition Platform for Developers of 3D Applications", Product Datasheet, IISU™, www.softkinetic-optrima.com, Belgium, 2 pages, 2007-2010.

Li et al., "Real-Time 3D Motion Tracking with Known Geometric Models", Real-Time Imaging Journal, vol. 5, pp. 167-187, Academic Press 1999.

Segen et al., "Shadow gestures: 3D hand pose estimation using a single camera", Proceedings of IEEE International Conference on Computer Vision and Pattern Recognition, pp. 479-485, Fort Collins, USA, Jun. 23-25, 1999.

Vogler et al., "ASL recognition based on a coupling between HMMs and 3D motion analysis", Proceedings of IEEE International Conference on Computer Vision, pp. 363-369, Mumbai, India, Jan. 4-7, 1998.

Gionis et al., "Similarity Search in High Dimensions via Hashing", Proceedings of the 25th Very Large Database (VLDB) Conference, Edinburgh, UK, 12 pages, Sep. 7-10, 1999.

Bleiweiss et al., "Markerless Motion Capture Using a Single Depth Sensor", SIGGRAPH Asia 2009, Yokohama, Japan, 1 page, Dec. 16-19, 2009.

Comaniciu et al., "Mean Shift: A Robust Approach Toward Feature Space Analysis", IEEE Transactions on Pattern Analysis and Machine Intelligence, vol. 24, No. 4, pp. 603-619, May 2002.

Datar et al., "Locality-Sensitive Hashing Scheme Based on p-Stable Distributions", Proceedings of the Symposium on Computational Geometry, pp. 253-262, Brooklyn, USA, Jun. 9-11, 2004.

Dekker, L., "Building Symbolic Information for 3D Human Body Modeling from Range Data", Proceedings of the Second International Conference on 3D Digital Imaging and Modeling, IEEE computer Society, pp. 388-397, Ottawa, Canada, Oct. 4-8, 1999.

Holte et al., "Gesture Recognition using a Range Camera", Technical Report, Laboratory of Computer Vision and Media Technology, Aalborg University, Denmark, 5 pages, Feb. 2007.

Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 11 pages, Jun. 2007.

Nam et al., "Recognition of Hand Gestures with 3D, Nonlinear Arm Movements", Pattern Recognition Letters, vol. 18, No. 1, pp. 105-113, Elsevier Science B.V. 1997.

U.S. Appl. No. 14/697,661 Office Action dated Jun. 9, 2017.

Ren et al., "Faster R-CNN: Towards Real-Time Object Detection with Region Proposal Networks", 14 pages, Jan. 6, 2016.

Eshet et al, U.S. Appl. No. 15/592,228, filed May 11, 2017.

Ren et al., "Real-time modeling of 3-D soccer ball trajectories from multiple fixed cameras", IEEE Transactions on Circuits and Systems for Video Technology, vol. 18, No. 3, pp. 350-362, Mar. 2008.

(56) References Cited

OTHER PUBLICATIONS

Li et al., "Statistical modeling of complex backgrounds for foreground object detection", IEEE Transactions on Image Processing, vol. 13, No. 11,pp. 1459-1472, Nov. 2004.

Grzeszczuk et al., "Stereo based gesture recognition invariant for 3D pose and lighting", Proceedings of IEEE Conference on Computer Vision and Pattern Recognition, vol. 1, pp. 826-833, Jun. 13-15, 2000.

Primesense Inc., "Prime Sensor™ NITE 1.1 Framework Programmer's Guide", Version 1.2, 34 pages, 2009.

Luxand Inc., "Luxand FaceSDK 3.0 Face Detection and Recognition Library Developer's Guide", 45 pages, years 2005-2010.

Intel Corporation, "Open Source Computer Vision Library Reference Manual", 377 pages, years 1999-2001.

Arya et al., "An Optimal Algorithm for Approximate Nearest Neighbor Searching in Fixed Dimensions", Association for Computing Machinery Journal, vol. 45, issue 6, pp. 891-923, New York, USA, Nov. 1998.

Muja et al., "Fast Approximate Nearest Neighbors with Automatic Algorithm Configuration", International Conference on Computer Vision Theory and Applications, pp. 331-340, Lisboa, Portugal, Feb. 5-8, 2009.

Mori et al., "Estimating Human Body Configurations Using Shape Context Matching", Proceedings of the European Conference on Computer Vision, vol. 3, pp. 666-680, Copenhagen, Denmark, May 27-Jun. 2, 2002.

Agarwal et al., "Monocular Human Motion Capture with a Mixture of Regressors", Proceedings of the 2004 IEEE Conference on Computer Vision and Pattern Recognition, San Diego, USA, 8 pages, Jun. 20-26, 2005.

Lv et al., "Single View Human Action Recognition Using Key Pose Matching and Viterbi Path Searching", Proceedings of IEEE Conference on Computer Vision and Pattern Recognition, Minneapolis, USA, 20 pages, Jun. 17-22, 2007.

Munoz-Salinas et al., "People Detection and Tracking Using Stereo Vision and Color", Image and Vision Computing, vol. 25, No. 6, pp. 995-1007, Jun. 1, 2007.

Bradski, G., "Computer Vision Face Tracking for Use in a Perceptual User Interface", Intel Technology Journal, 15 pages, vol. 2, issue 2 (2nd Quarter 2008).

Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, 5 pages, Sep. 2001.

Kolsch et al., "Fast 2D Hand Tracking with Flocks of Features and Multi-Cue Integration", IEEE Workshop on Real-Time Vision for Human Computer Interaction (at CVPR'04), Washington, USA, 8 pages, Jun. 27-Jul. 2, 2004.

Shi et al., "Good Features to Track", IEEE Conference on Computer Vision and Pattern Recognition, pp. 593-600, Seattle, USA, Jun. 21-23, 1994.

Vosselman et al., "3D Building Model Reconstruction From Point Clouds and Ground Plans", International Archives of Photogrammetry and Remote Sensing, vol. XXXIV-3/W4, pp. 37-43, Annapolis, USA, Oct. 22-24, 2001.

Submuth et al., "Ridge Based Curve and Surface Reconstruction", Eurographics Symposium on Geometry Processing, Barcelona, Spain, 9 pages, Jul. 4-6, 2007.

Fergus et al., "Object Class Recognition by Unsupervised Scale-Invariant Learning", Proceedings of the IEEE Conference on Computer Vision and Pattern Recognition, vol. 2, pp. 264-271, Jun. 18-20, 2003.

Cohen et al., "Interference of Human Postures by Classification of 3D Human Body Shape", IEEE International Workshop on Analysis and Modeling of Faces and Gestures, ICCV 2003, Nice, France, 8 pages, Oct. 14-17, 2002.

Agarwal et al., "3D Human Pose from Silhouettes by Relevance Vector Regression", Proceedings of the IEEE Conference on Computer Vision and Pattern Recognition, vol. 2, pp. 882-888, Jun. 27-Jul. 2, 2004.

Borenstein et al., "Combining Top-down and Bottom-up Segmentation", Proceedings of the IEEE Conference on Computer Vision and Pattern Recognition, 8 pages, Jun. 27-Jul. 2, 2004.

Karlinsky et al., "Combined Model for Detecting, Localizing, Interpreting and Recognizing Faces", Faces in Real-Life Images workshop, European Conference on Computer Vision, France, 14 pages, Oct. 12-18, 2008.

Ullman, S., "Object Recognition and Segmentation by a Fragment-Based Hierarchy", Trends in Cognitive Sciences, vol. 11, No. 2, pp. 58-64, Feb. 2007.

Shakhnarovich et al., "Fast Pose Estimation with Parameter Sensitive Hashing", Proceedings of the 9th IEEE International Conference on Computer Vision (ICCV 2003), pp. 750-759, Nice, France, Oct. 14-17, 2003.

Ramanan et al., "Training Deformable Models for Localization", Proceedings of the 2006 IEEE Conference on Computer Vision and Pattern Recognition, pp. 206-213, New York, USA, Jun. 17-22, 2006.

Ramanan, D., "Learning to Parse Images of Articulated Bodies", Neural Information Processing Systems Foundation 8 pages, year 2006.

Jiang, H., "Human Pose Estimation Using Consistent Max-Covering", 12th IEEE International Conference on Computer Vision, Kyoto, Japan, 8 pages, Sep. 27-Oct. 4, 2009.

Shotton et al., "Real-Time Human Pose Recognition in Parts from Single Depth Images", 24th IEEE Conference on Computer Vision and Pattern Recognition, Colorado Springs, USA, 8 pages, Jun. 20-25, 2011.

Rodgers et al., "Object Pose Detection in Range Scan Data", IEEE Conference on Computer Vision and Pattern Recognition, pp. 2445-2452, New York, USA, Jun. 17-22, 2006.

Ess et al., "Improved multi-person tracking with active occlusion handling", ICRA workshop of people Detection and tracking, pp. 1-6, 2009.

Cucchiara et al., "Track-based and object-based occlusion for people tracking refinement indoor surveillance", VSSN, pp. 1-7, 2004.

Krumm et al., "Multi-camera multi person tracking for EasyLiving"., Visual surveillance, 2000, Proceedings, Third International workshop pp. 1-8, 2000.

Yous et al., "People detection and tracking with World-Z map from single stereo camera"., Visual surveillance, 2008, Eighth International workshop , pp. 1-8, 2008.

Damen et al., "Detecting carried objects in short video sequences", ECCV , School of computing, University of Leeds, pp. 1-14, 2008.

Ran et al., "Multi moving people detection from binocular sequences", Center for Automation Research Institute of Advanced Computer Studies, University of Maryland, pp. 1-4, 2003.

Balcells et al., "An appearance-based approach for consistent labeling of humans and objects in video", Pattern Analysis and Application, pp. 373-385, 2004.

Gordon et al., "Face recognition based on depth maps and surface curvature", Proceedings of SPIE Geometric methods in Computer Vision, vol. 1570, pp. 234-247, Sep. 1, 1991.

Kim et al., "Real-time normalization and feature extraction of 3D face data using curvature characteristics", Proceedings 10th IEEE International Workshop on Robot and Human Interactive Communication, pp. 74-79, Sep. 18-21, 2001.

Colombo et al., "3D face detection using curvature analysis", Pattern Recognition, vol. 39, No. 3, pp. 444-455, Mar. 1, 2006.

Alyuz et al., "Regional Registration for Expression Resistant 3-D Face Recognition", IEEE Transactions on Information Forensics and Security, vol. 5, No. 3, pp. 425-440, Sep. 1, 2010.

Lee et al., "Matching range images of human faces", Proceedings of 3rd International Conference on Computer Vision, vol. 3, pp. 722-726, Dec. 4-7, 1990.

Alyuz et al., "Robust 3D face recognition in the presence of realistic occlusions", 5th IAPR International Conference on Biometrics (ICB), pp. 111-118, Mar. 29-Apr. 1, 2012.

(56) References Cited

OTHER PUBLICATIONS

International Application # PCT/US2017/039172 search report dated Sep. 15, 2017.

* cited by examiner

ROBUST DETECTION AND CLASSIFICATION OF BODY PARTS IN A DEPTH MAP

CROSS-REFERENCE TO RELATED APPLICATION

This application is a continuation of U.S. patent application Ser. No. 14/960,465, filed Dec. 7, 2015.

FIELD OF THE INVENTION

The present invention relates generally to methods and systems for three-dimensional (3D) mapping, and specifically to processing of 3D map data.

BACKGROUND

A number of different methods and systems are known in the art for creating depth maps. In the present patent application and in the claims, the term "depth map" refers to a representation of a scene as a two-dimensional matrix of pixels, in which each pixel corresponds to a respective location in the scene and has a respective pixel depth value, indicative of the distance from a certain reference location to the respective scene location. In other words, the depth map has the form of an image in which the pixel values indicate topographical information, rather than brightness and/or color of the objects in the scene. Depth maps may be created, for example, by detection and processing of an image of an object onto which a pattern is projected, as described in U.S. Pat. No. 8,456,517, whose disclosure is incorporated herein by reference. The terms "depth map" and "3D map" are used herein interchangeably and have the same meaning.

Depth maps may be processed in order to segment and identify objects in the scene. Identification of humanoid forms (meaning 3D shapes whose structure resembles that of a human being) in a depth map, and changes in these forms from scene to scene, may be used as a means for controlling computer applications. For example, U.S. Pat. No. 8,249,334, whose disclosure is incorporated herein by reference, describes a computer-implemented method in which a depth map is segmented so as to find a contour of a humanoid body. The contour is processed in order to identify a torso and one or more limbs of the body. An input is generated to control an application program running on a computer by analyzing a disposition of at least one of the identified limbs in the depth map.

As another example, U.S. Pat. No. 8,565,479, whose disclosure is incorporated herein by reference, describes a method for processing a temporal sequence of depth maps of a scene containing a humanoid form. A digital processor processes at least one of the depth maps so as to find a location of the head of the humanoid form, and estimates dimensions of the humanoid form based on this location. The processor tracks movements of the humanoid form over the sequence using the estimated dimensions.

U.S. Pat. No. 9,047,507, whose disclosure is incorporated herein by reference, describes a method that includes receiving a depth map of a scene containing at least an upper body of a humanoid form. The depth map is processed so as to identify a head and at least one arm of the humanoid form in the depth map. Based on the identified head and at least one arm, and without reference to a lower body of the humanoid form, an upper-body pose, including at least three-dimensional (3D) coordinates of shoulder joints of the humanoid form, is extracted from the depth map.

SUMMARY

Embodiments of the present invention provide methods, devices and software for extracting information from depth maps.

There is therefore provided, in accordance with an embodiment of the invention, a method for processing data, which includes receiving a depth map of a scene containing at least a part of a body of a humanoid form, the depth map including a matrix of pixels having respective pixel depth values. Using a digital processor, a curvature map of the scene is extracted from the depth map, the curvature map including respective curvature values and curvature orientations of at least some of the pixels in the matrix. The depth map is segmented using the curvature values and curvature orientations in the curvature map so as to extract three-dimensional (3D) coordinates of one or more limbs of the humanoid form.

In a disclosed embodiment, extracting the curvature map includes computing, for each of the at the at least some of the pixels in the curvature map, a dominant, signed value of the curvature and a corresponding curvature orientation.

In some embodiments, segmenting the depth map includes identifying blobs of the pixels in the depth map that correspond to the one or more limbs of the humanoid form, computing, for each blob, a dominant curvature direction of the blob responsively to the curvature orientations, and defining a respective axis of each limb running perpendicular to the dominant curvature direction of a corresponding blob. In a disclosed embodiment, segmenting the depth map includes processing the depth map so as to locate ridges running along respective axes of the one or more limbs, each ridge including a chain of the pixels whose respective curvature values are local maxima, and identifying locations and orientations of the one or more limbs based on the ridges. Additionally or alternatively, computing the dominant curvature direction includes, for each blob, constructing a histogram of curvature directions of the pixels in the blob, and identifying the dominant curvature direction with a mode of the histogram.

Typically, segmenting the depth map includes identifying blobs in the curvature map over which the pixels have respective curvature values that are indicative of a convex surface, and finding edges of the blobs in the depth map at locations of sign changes in the curvature map.

There is also provided, in accordance with an embodiment of the invention, apparatus for processing data, including an imaging assembly, which is configured to capture a depth map of a scene containing at least a part of a body of a humanoid form. A processor is configured to extract from the depth map a curvature map of the scene, and to segment the depth map using the curvature values and curvature orientations in the curvature map so as to extract three-dimensional (3D) coordinates of one or more limbs of the humanoid form.

There is additionally provided, in accordance with an embodiment of the invention, a computer software product, including a non-transitory computer-readable medium in which program instructions are stored, which instructions, when read by a computer, cause the computer to receive a depth map of a scene containing at least a part of a body of a humanoid form, to extract from the depth map a curvature map of the scene, and to segment the depth map using the curvature values and curvature orientations in the curvature map so as to extract three-dimensional (3D) coordinates of one or more limbs of the humanoid form.

The present invention will be more fully understood from the following detailed description of the embodiments thereof, taken together with the drawings in which:

DETAILED DESCRIPTION OF EMBODIMENTS

Overview

Figure 1:
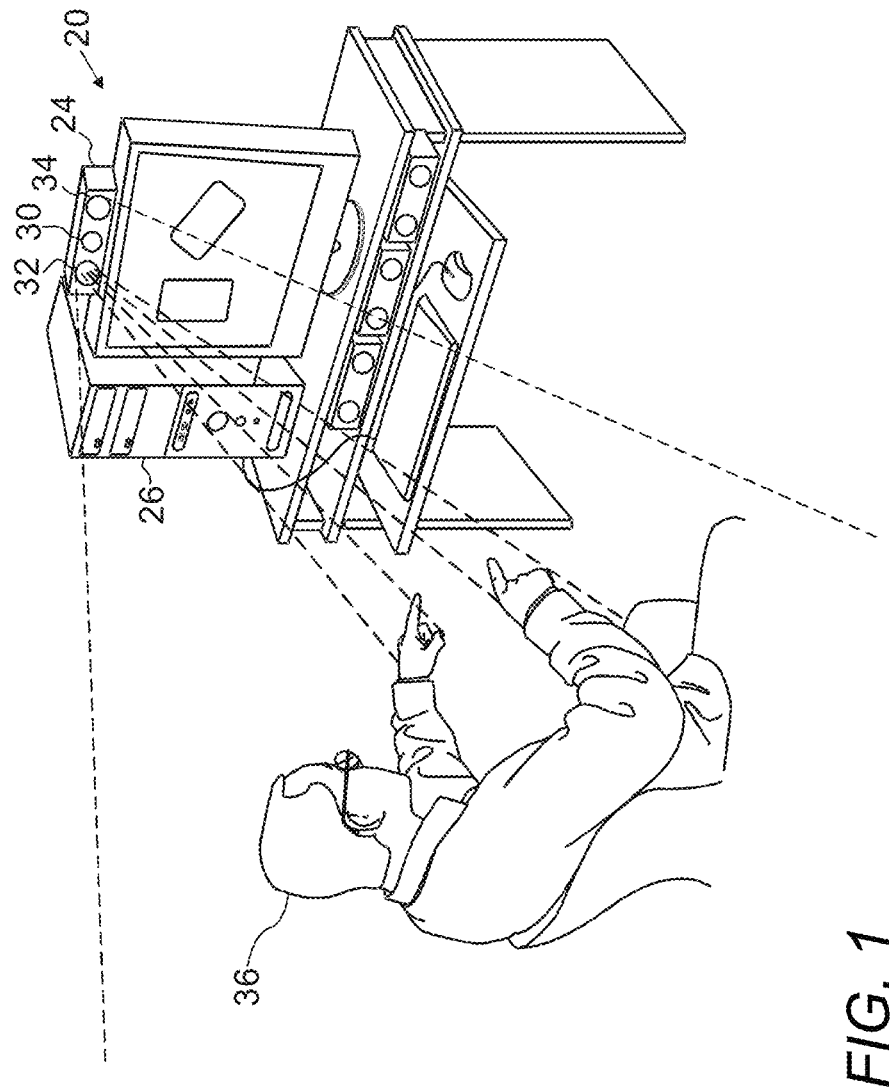
FIG. 1 is a schematic, pictorial illustration of a system for 3D mapping of humanoid forms, in accordance with an embodiment of the present invention.

Depth maps contain a wealth of data, but extracting high-level information from depth maps is often difficult. Finding and tracking the pose of a humanoid form in a depth map, for example, requires that a digital processor separate the limbs from the background and other objects in the depth map and correctly identify the positions and orientations of the limbs. (The term "limbs" is used in the context of the present description and in the claims to refer to the arms, legs, and head.) This task may become even more challenging when only a part of the humanoid form, such as the upper body, is captured in the depth map or when the humanoid form is seated or otherwise positioned directly against a background object.

Embodiments of the present invention that are described hereinbelow provide robust, efficient methods, systems and software for extracting humanoid forms from depth maps. In the disclosed methods, a digital processor extracts a curvature map from the depth map of a scene containing a humanoid form. The curvature map comprises respective oriented curvatures of at least some of the pixels in the matrix. In other words, at each of these pixels, the curvature map holds a scalar signed value indicating the dominant curvature value and the corresponding curvature orientation, i.e., the direction of the dominant curvature. The processor segments the depth map using both curvature values and orientations in the curvature map, and thus extracts 3D location and orientation coordinates of one or more limbs of the humanoid form.

In the disclosed embodiments, the processor segments the depth map by identifying blobs in the curvature map over which the pixels have a positive curvature, meaning that the surfaces of these blobs are convex (although this definition of "positive" curvature is arbitrary, and curvature could alternatively be defined so that convex surfaces have negative curvature). The edges of the blobs are identified in the depth map at locations of sign changes in the curvature map. This use of curvature enhances the reliability and robustness of segmentation, since it enables the processor to distinguish between different blobs and between blobs and the background even when there is no marked change in depth at this edges of a given blob, as may occur when one body part occludes another, or when a body part is resting against a background surface or other object.

In some embodiments, the processor computes the dominant curvature direction of the blob based on statistics of the pixel-wise curvature orientations—for example, by taking the mode of a histogram of the curvatures. The axis of each blob (and thus of the limb to which the blob corresponds) is defined as a perpendicular to the dominant curvature direction. The axis of each limb indicates its angle of orientation, and thus enables the processor to search over only a small range of rotations in detecting and classifying features such as the head and face of the humanoid subject. As part of the process of identifying the locations and orientations of the limbs, the processor may locate ridges running along the respective limb axes, wherein each ridge comprises a chain of the pixels whose respective curvature values are local maxima.

System Description

FIG. 1 is a schematic, pictorial illustration of a system 20 for depth mapping and imaging, in accordance with an embodiment of the present invention. In this example, an imaging assembly 24 is configured to capture and process depth maps and images of a scene, which in this case contains a humanoid subject 36. An imaging assembly of this sort is described, for example, in the above-mentioned U.S. Pat. No. 8,456,517. The principles of the present invention are by no means limited to the sort of pattern-based mapping that is described in this patent, however, and may be applied in processing depth maps generated by substantially any suitable technique that is known in the art, such as depth mapping based on stereoscopic imaging or time-of-flight measurements.

In the example shown in FIG. 1, a projector 30 in imaging assembly 24 projects a pattern of optical radiation onto the scene, and a depth camera 32 captures an image of the pattern that appears on the scene (including subject 36). The optical radiation that is used for this purpose is typically in the infrared (IR) range. A processing device in assembly 24 processes the image of the pattern in order to generate a depth map of the body, i.e., an array of 3D coordinates, comprising a depth (Z) coordinate value of the objects in the scene at each point (X,Y) within a predefined area. (In the context of an array of image-related data, these (X,Y) points are also referred to as pixels.)

Optionally, a color camera 34 in imaging assembly 24 also captures color (2D) images of the scene. The imaging assembly registers and synchronizes the depth maps with the color images, and generates a data stream that includes the depth maps and image data for output to an image processor, such as a computer 26. Although computer 26 is shown in FIG. 1 as a separate unit from imaging assembly 24, the functions of these two components may alternatively be combined in a single physical unit, and the depth mapping and image processing functions of system 20 may even be carried out by a single processor.

Computer 26 processes the data generated by assembly 24 in order to segment and identify the parts of the body of subject 36 and find the pose of the body, i.e., the locations and orientations of at least some of the limbs. Typically, computer 26 comprises a general-purpose computer processor, which is programmed in software to carry out the above functions. The software may be downloaded to the processor in electronic form, over a network, for example, or it may alternatively be provided on tangible, non-transitory media, such as optical, magnetic, or electronic memory media. Further alternatively or additionally, at least some of the functions of computer 26 may be carried out by hard-wired or programmable logic components.

Figure 2:
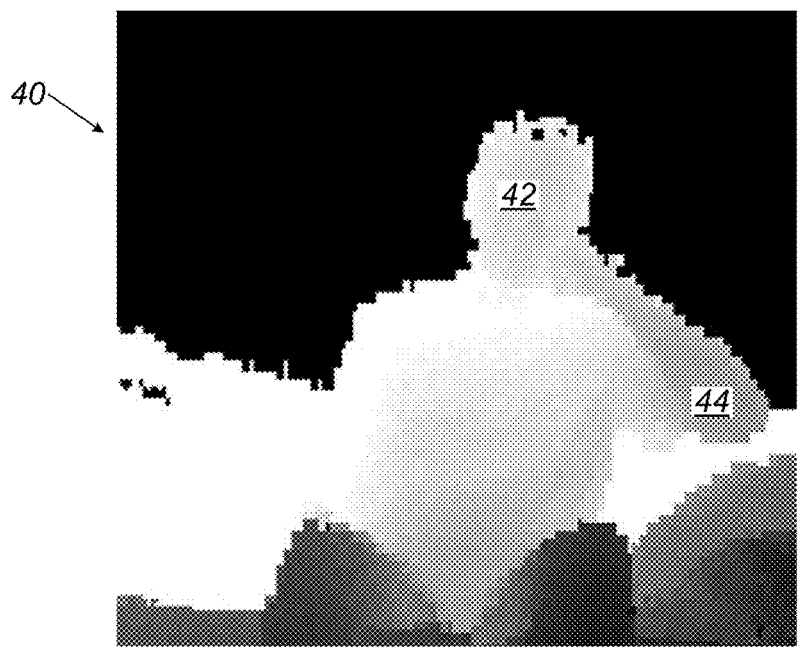
FIG. 2 is a schematic representation of a depth map, in accordance with an embodiment of the present invention.

FIG. 2 is a schematic representation of a depth map captured by assembly 24, in accordance with an embodiment of the present invention. The depth map, as explained above, comprises a matrix of pixels having respective depth values. The depth values are represented in FIG. 2 as gray-scale values, with darker shades of gray corresponding to smaller depth values, i.e., locations closer to assembly 24. (Black areas correspond to pixels for which no depth values could be determined.) In this particular scene, the depth values of subject 36 blend into those of the chair on which the subject is sitting. Although a head 42 and a forearm 44 of the subject can be roughly discerned, the boundaries between the head and forearm and between the forearm and other parts of the body are difficult to delineate on the basis of the depth values by themselves.

Methods for Processing and Segmentation

Figure 3:
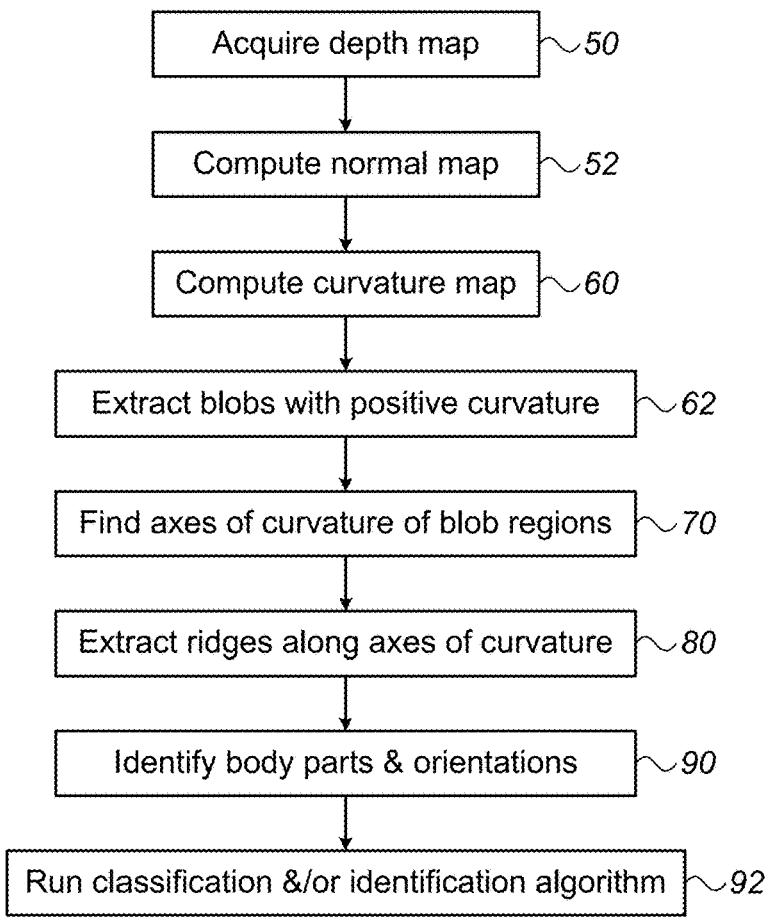
FIG. 3 is a flow chart that schematically illustrates a method for extracting a humanoid form from a depth map, in accordance with an embodiment of the present invention.

FIG. 3 is a flow chart that schematically illustrates a method for extracting a humanoid form from a depth map, in accordance with an embodiment of the present invention. The method will be described hereinbelow, for the sake of clarify and concreteness, with specific reference to the elements of system 20 (FIG. 1) and the features of depth map 40 (FIG. 2). The principles of this method, however, may alternatively be applied in other system configurations and in processing of depth maps of humanoid subjects in other poses and surroundings.

Computer 26 initiates the method of FIG. 3 upon receiving a depth map, such as map 40, at a map acquisition step 50. Taking u-v to be the surface parameterization grid, p=p(u,v) represents the surface points of map 40 in 3D. Based on the depth values in map 40, computer 26 calculates the depth gradient at each point, at a normal mapping step 52. The result of this computation is a normal map, in which N=N(u,v) is the surface normal at point p, so that each pixel holds a vector value corresponding to the direction of the normal to the surface defined by the depth map at the corresponding point is space.

Figure 4:
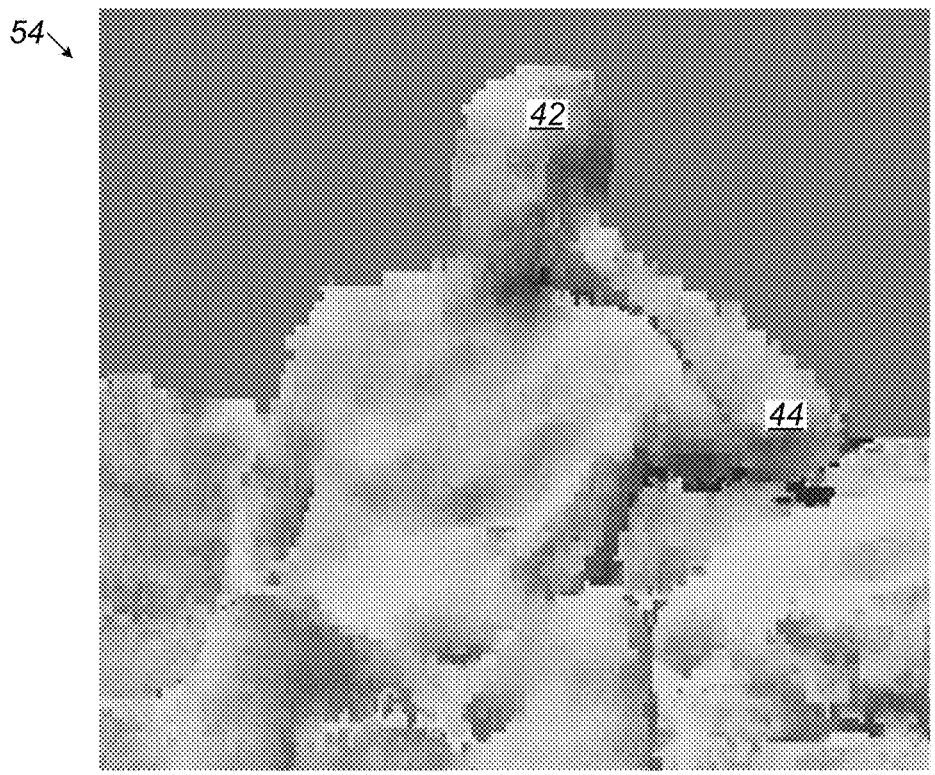
FIG. 4 is a schematic representation of a normal map extracted from the depth map of FIG. 2, in accordance with an embodiment of the present invention.

FIG. 4 is a schematic representation of a normal map 54 extracted at step 52 from depth map 40, in accordance with an embodiment of the present invention. The normal vectors are difficult to show in gray-scale representation, and map 54 is therefore presented only for the sake of general illustration. Pixels whose normals are close to the Z-direction (pointing out of the page) have light shades of gray in FIG. 4, while those angled toward the X-Y plane are darker. In this respect, the high curvature of head 42 and forearm 44 can be observed in terms of the marked gray-scale gradation in FIG. 4, and this feature will be used in the subsequent steps of the analysis.

Returning now to FIG. 3, computer 26 computes a curvature map, based on normal map 54, at a curvature computation step 60. The curvature computed for each pixel at this step can be represented in a 2×2 matrix form known in 3D geometry as the shape operator, S, which is defined as follows:

$$x1 = \frac{\partial p}{\partial u}$$

$$x2 = \frac{\partial p}{\partial v}$$

$$G = \begin{pmatrix} x1 \cdot x1 & x1 \cdot x2 \\ x1 \cdot x2 & x2 \cdot x2 \end{pmatrix}$$

$$B = \begin{pmatrix} \frac{\partial N}{\partial u} \cdot x1 & \frac{\partial N}{\partial u} \cdot x2 \\ \frac{\partial N}{\partial v} \cdot x1 & \frac{\partial N}{\partial v} \cdot x2 \end{pmatrix}$$

$$S = B \cdot G^{-1}$$

Computer 26 extracts the shape operator eigenvectors, corresponding to the two main curvature orientation, and the shape operator eigenvalues, corresponding to the curvature values along these orientations. The curvature map comprises the dominant curvature per pixel, i.e., the eigenvalue with the larger absolute value and the corresponding curvature orientation. The raw curvature value can be either positive or negative, with positive curvature corresponding to convex surface patches, and negative curvature corresponding to concave surface patches.

Computer 26 uses the curvature map computed at step 60 in extracting blobs having positive curvature from depth map 40, at a blob extraction step 62. Since body parts, such as head 42 and forearm 44, are inherently convex, positive curvature within a blob of pixels is a necessary condition for the blob to correspond to such a body part. Furthermore, as noted earlier, transitions from positive to negative curvature are good indicators of the edges of a body part, even when the body part is in contact with another object without a sharp depth gradation between the body part and the object.

Figure 5:
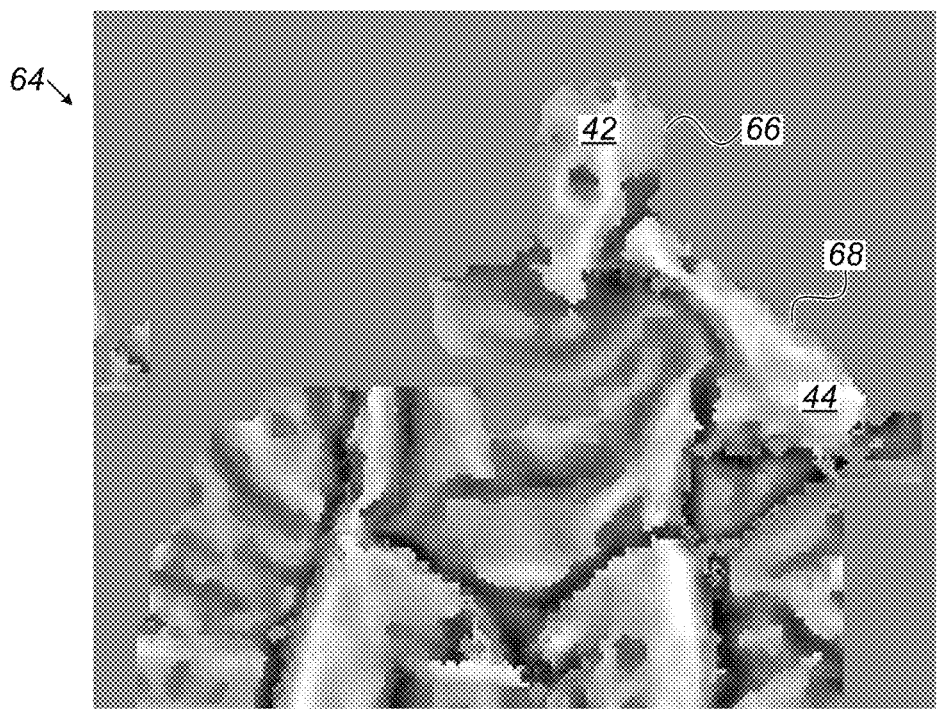
FIG. 5 is a schematic representation of a curvature map extracted from the normal map of FIG. 4, in accordance with an embodiment of the present invention.
Figure 6:
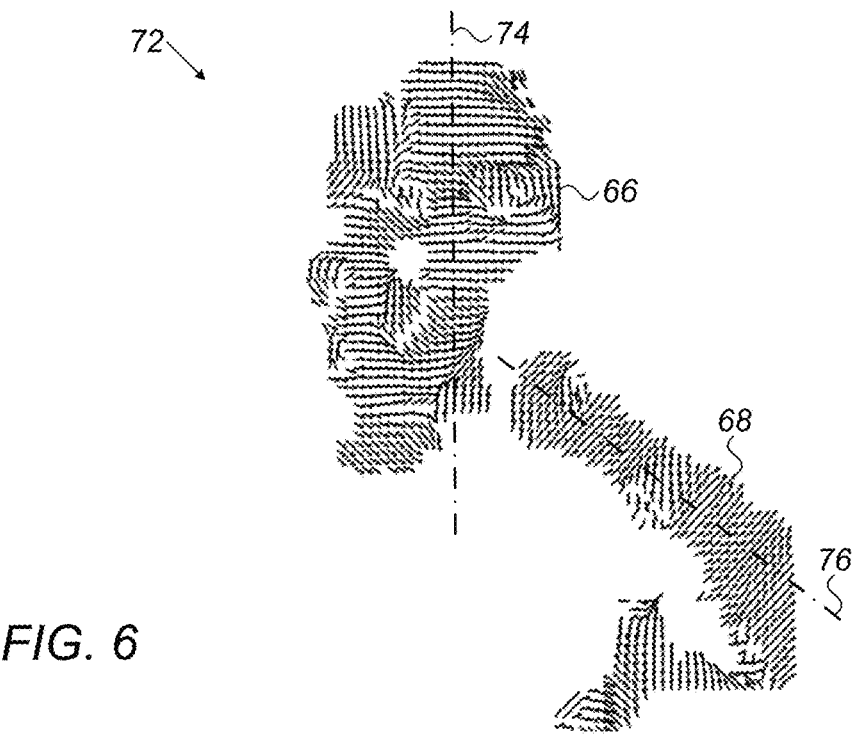
FIG. 6 is a schematic representation of a map of curvature direction, extending over a portion of the curvature map of FIG. 5, in accordance with an embodiment of the invention.

FIG. 5 is a schematic representation of a curvature map 64 extracted from normal map 54 (and hence from depth map 40), in accordance with an embodiment of the present invention. Due to the limitations of gray-scale graphics, curvature map 64 shows only the magnitude of the curvature (i.e., the dominant eigenvalue of the curvature matrix, as explained above), whereas the curvature direction is shown in FIG. 6. Pixels with strongly positive curvature values have light shades of gray in map 64, while pixels with negative curvature values are dark gray. Blobs 66 and 68 of strongly-positive curvature, corresponding respectively to head 42 and forearm 44, can be clearly segmented from other objects and from one another based on the changes in sign of the curvature at their edges.

Referring again to FIG. 3, computer 26 uses the pixel-wise curvature orientations in curvature map 64 to find the axes of curvature of blobs in the curvature map, such as blobs 66 and 68, at an axis extraction step 70. The curvature vector direction, as explained above, is the direction of the major (dominant) eigenvector of the curvature matrix found at step 60. The axis of each blob is a line in depth map 40 (or curvature map 64) that runs through the center of mass of the blob in a direction perpendicular to the dominant curvature direction over the blob. Typically, computer 26 identifies the dominant curvature direction as the statistical mode of the curvature directions of all the pixels. In other words, for each blob, the computer constructs a histogram of the curvature directions of the pixels in the blob, and identifies the dominant curvature direction as the mode of the histogram. If the histogram contains multi-modal behavior, each mode is analyzed independently, dividing the blob into multiple sub-blobs. Alternatively, other statistical averages, such as the mean or median, may be identified as the dominant curvature direction.

Curvature values are useful in segmenting blobs even in the absence of abrupt transition in depth. Adding curvature orientations serves as an additional refinement to detect multi-modalities and filter out pixels that are not aligned with the dominant blob orientation. The disclosed combination of depth, normals, curvature values, and curvature orientations boosts the robustness of the segmentation process.

FIG. 6 is a schematic representation of a map 72 of curvature direction, extending over a portion of curvature map 64, in accordance with an embodiment of the invention. Axes 74 and 76 of blobs 66 and 68, respectively, correspond to the orientation angles of head 42 and forearm 44. The mode of the curvature thus provides a reliable indicator of the orientation of the corresponding body parts, which can be used to simplify and enhance the reliability of subsequent classification and pose detection.

Returning once again to FIG. 3, computer 26 uses the blobs extracted at step 62 and the axes found at step 70 in extracting ridges from depth map 40, at a ridge extraction step 80. Each ridge comprises a chain of pixels whose respective curvature values are local maxima. A ridge typically aligns with the dominant curvature direction of the blob to which it belongs. The ridges thus run approximately along the respective axes of the blobs.

Figure 7:
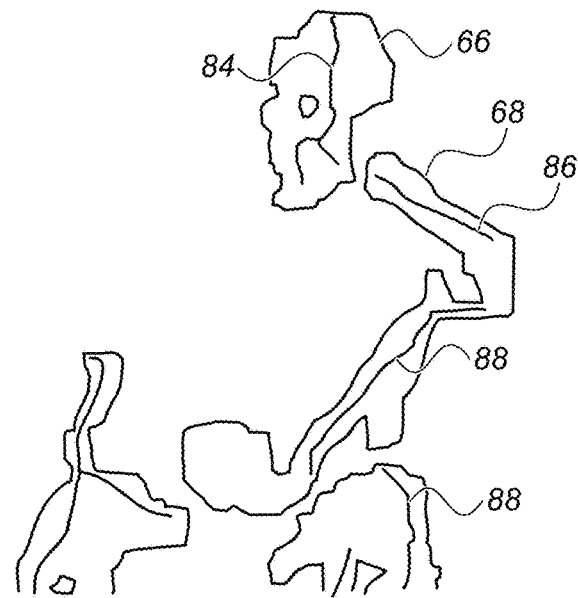
FIG. 7 is a schematic representation of a map of blobs and ridges extracted from the preceding maps, in accordance with an embodiment of the invention.

FIG. 7 is a schematic representation of a map 82 of blobs 66, 68, . . . , and ridges 84, 86, 88, . . . extracted from the preceding maps, in accordance with an embodiment of the invention. Ridges 84 and 86 give a good indication of the location and orientation of head 42 and forearm 44. Other ridges 88 correspond to the legs, right arm, and torso of the subject, which can be identified and classified by further analysis.

Based on ridges 84, 86 and the other blob features described above, computer 26 identifies the locations and orientations of at least some of the limbs in depth map 40, at a body part identification step 90. To complete the analysis, computer 26 runs one or more classification and/or identification algorithms over the data in depth map 40, at a map analysis step 92. For example, the directions and locations of axes 74, 76 and corresponding ridges 84, 86 may be used in finding the medial axes of the limbs of the humanoid form, and then assembling these medial axes into a skeleton indicative of the dimensions and pose of the limbs and torso. Techniques that can be applied for this latter purpose are described, for example, in the patents cited above in the Background section.

As another example, computer 26 may apply a face detection algorithm at step 92 in order to detect the subject's face of depth map 40. In this regard, the localization and orientation estimation of blob 66, axis and ridge 84, enable the computer to search for a candidate face in a narrow range of scales and orientations. As a result, the computational resources and time required to complete the detection are reduced, while the reliability of the results is enhanced.

Although the embodiments described above relate particularly to segmenting 3D maps of humanoid subjects and finding the poses of the subjects in such maps, the principles of the present invention are similarly applicable, mutatis mutandis, in analysis of 3D maps of other sorts of objects and scenes. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
receiving a depth map of a scene containing at least a part of a body of a humanoid form, the depth map comprising a matrix of pixels having respective pixel depth values;
using a digital processor, extracting from the depth map a curvature map of the scene, the curvature map comprising respective curvature values and curvature orientations of at least some of the pixels in the matrix; and
segmenting the depth map using the curvature values and curvature orientations in the curvature map so as to extract three-dimensional (3D) coordinates of one or more limbs of the humanoid form,
wherein segmenting the depth map comprises:
identifying blobs of the pixels in the depth map that correspond to the one or more limbs of the humanoid form;
computing, for each blob, a dominant curvature direction of the blob responsively to the curvature orientations;
defining a respective axis of each limb running perpendicular to the dominant curvature direction of a corresponding blob;
processing the depth map so as to locate ridges running along respective axes of the one or more limbs, each ridge comprising a chain of the pixels whose respective curvature values are local maxima; and
identifying locations and orientations of the one or more limbs based on the ridges.

2. The method according to claim 1, wherein extracting the curvature map comprises computing, for each of the at least some of the pixels in the curvature map, a dominant, signed value of the curvature and a corresponding curvature orientation.

3. The method according to claim 1, wherein computing the dominant curvature direction comprises, for each blob, constructing a histogram of curvature directions of the pixels in the blob, and identifying the dominant curvature direction with a mode of the histogram.

4. The method according to claim 1, wherein segmenting the depth map comprises identifying blobs in the curvature map over which the pixels have respective curvature values that are indicative of a convex surface.

5. The method according to claim 4, wherein identifying the blobs comprises finding edges of the blobs in the depth map at locations of sign changes in the curvature map.

6. Apparatus for processing data, comprising:
an imaging assembly, which is configured to capture a depth map of a scene containing at least a part of a body of a humanoid form, the depth map comprising a matrix of pixels having respective pixel depth values; and
a processor, which is configured to extract from the depth map a curvature map of the scene, the curvature map comprising respective curvature values and curvature orientations of at least some of the pixels in the matrix, and to segment the depth map using the curvature values and curvature orientations in the curvature map so as to extract three-dimensional (3D) coordinates of one or more limbs of the humanoid form,
wherein the processor is configured to identify blobs of the pixels in the depth map that correspond to the one or more limbs of the humanoid form, to compute, for each blob, a dominant curvature direction of the blob responsively to the curvature orientations, to define a respective axis of each limb running perpendicular to the dominant curvature direction of a corresponding blob, to process the depth map so as to locate ridges running along respective axes of the one or more limbs, each ridge comprising a chain of the pixels whose respective curvature values are local maxima, and to identify locations and orientations of the one or more limbs based on the ridges.

7. The apparatus according to claim 6, wherein the curvature map comprises, for each of the at least some of pixels in the curvature map, a dominant, signed value of the curvature and a corresponding curvature orientation.

8. The apparatus according to claim 6, wherein the processor is configured to construct, for each blob, a histogram of curvature directions of the pixels in the blob, and to identify the dominant curvature direction with a mode of the histogram.

9. The apparatus according to claim 6, wherein the processor is configured to segment the depth map by identifying blobs in the curvature map over which the pixels have respective curvature values that are indicative of a convex surface.

10. The apparatus according to claim 9, wherein the processor is configured to find edges of the blobs in the depth map at locations of sign changes in the curvature map.

11. A computer software product, comprising a non-transitory computer-readable medium in which program instructions are stored, which instructions, when read by a computer, cause the computer to receive a depth map of a scene containing at least a part of a body of a humanoid form, the depth map comprising a matrix of pixels having respective pixel depth values, to extract from the depth map a curvature map of the scene, the curvature map comprising respective curvature values and curvature orientations of at least some of the pixels in the matrix, and to segment the depth map using the curvature values and curvature orientations in the curvature map so as to extract three-dimensional (3D) coordinates of one or more limbs of the humanoid form,
wherein the instructions cause the computer to identify blobs of the pixels in the depth map that correspond to the one or more limbs of the humanoid form, to compute, for each blob, a dominant curvature direction of the blob responsively to the curvature orientations, to define a respective axis of each limb running perpendicular to the dominant curvature direction of a corresponding blob, to process the depth map so as to locate ridges running along respective axes of the one or more limbs, each ridge comprising a chain of the pixels whose respective curvature values are local maxima, and to identify locations and orientations of the one or more limbs based on the ridges.

12. The product according to claim 11, wherein the curvature map comprises, for each of the at least some of pixels in the curvature map, a dominant, signed value of the curvature and a corresponding curvature orientation.

13. The product according to claim 11, wherein the instructions cause the computer to construct, for each blob, a histogram of curvature directions of the pixels in the blob, and to identify the dominant curvature direction with a mode of the histogram.

14. The product according to claim 11, wherein the instructions cause the computer to segment the depth map by identifying blobs in the curvature map over which the pixels have respective curvature values that are indicative of a convex surface.

15. The product according to claim 14, wherein the instructions cause the computer to find edges of the blobs in the depth map at locations of sign changes in the curvature map.

\* \* \* \* \*